United States Patent [19]

Cappuccio et al.

[11] Patent Number: 5,567,747

[45] Date of Patent: Oct. 22, 1996

[54] WATER-BASED PRINTING INK

[75] Inventors: Anthony R. Cappuccio, Savannah, Ga.; Athanasios P. Rizopoulos, Bronx, N.Y.

[73] Assignee: Sun Chemical Corporation, Fort Lee, N.J.

[21] Appl. No.: 503,791

[22] Filed: Jul. 18, 1995

[51] Int. Cl.⁶ .............................. C08K 3/20; C08L 63/02
[52] U.S. Cl. ............................................. 523/403; 525/531
[58] Field of Search .............................. 523/403; 525/531

[56] References Cited

U.S. PATENT DOCUMENTS

| | | | |
|---|---|---|---|
| 4,166,054 | 8/1979 | Meeske et al. | 523/423 |
| 4,838,938 | 6/1989 | Tomida et al. | 106/22 |
| 5,108,505 | 4/1992 | Moffatt | 106/25 |
| 5,177,129 | 1/1993 | Bobo | 524/48 |
| 5,367,005 | 11/1994 | Nachfolger | 523/403 |

*Primary Examiner*—Melvyn I. Marquis
*Assistant Examiner*—D. Aylward
*Attorney, Agent, or Firm*—Jack Matalon

[57] ABSTRACT

The invention relates to a water-based oxidizing printing ink especially suited for flexographic printing. The ink comprises an epoxy ester resin, an inorganic and/or organic pigment, a drier, a cyclodextrin and water. Preferably, the ink also includes a drier activator such as 2,2'-bipyridyl and a wax.

13 Claims, No Drawings

WATER-BASED PRINTING INK

FIELD OF THE INVENTION

The invention relates to a water-based oxidizing printing ink. The ink has been found to be especially useful in flexographic printing processes.

BACKGROUND OF THE INVENTION

Water-based printing inks are well-known. Although such inks are preferred over solvent-based inks from an environmental point of view, they are disadvantageous from the standpoint that they are slow-drying as compared to solvent-based inks.

For flexographic printing processes, oxidizing water-based printing inks generally require the use of driers such as a cobalt naphthenate. However, the incorporation of driers into water-based inks tends to destabilize the ink, particularly at the relatively high levels of driers which are required for flexographic printing processes. Moreover, water-based inks containing the requisite levels of driers required for flexographic printing processes have objectionable odors.

SUMMARY OF THE INVENTION

It has now been found that oxidizing water-based printing inks especially suitable for flexographic printing processes may be prepared with relatively low levels of driers, provided a cyclodextrin is incorporated in the ink. The resultant inks dry rapidly, are quite stable and have no objectionable odor.

DETAILS OF THE INVENTION

The oxidizing water-based printing inks of the invention comprise an epoxy ester resin; an inorganic and/or organic pigment; a drier; a cyclodextrin; and water.

Preferably, the epoxy ester resin is present in an amount of about 15–40 wt. %, preferably 20–35 wt. %, based on the weight of the ink, and comprises the reaction product of (i) about 65–75 parts per hundred of the ester obtained from the esterification of about 40–60 parts per hundred of an epoxy resin with about 60–40 parts per hundred of a drying oil partially conjugated unsaturated fatty acid having an iodine number of about 125–185, an acid number of about 180–210 and a degree of conjugation of about 20–25%, said ester having an acid number below about 10, and (ii) about 35–25 parts per hundred of a mixture of about 20–28% of one or more unsaturated monobasic acids having a polymerizable double bond and about 80–72% of one or more reactive monomers having a polymerizable double bond, said epoxy resin comprising the condensation product of bisphenol A and epichlorohydrin and having an epoxide equivalent weight of about 400 to 1100 and represented by the structure below wherein n has a value of 0 to about 8, preferably a value of about 2.2:

amine such as 3 parts of triethanolamine and 3 parts of dimethylaminoethanol.

Preferably, the drying oil partially conjugated unsaturated fatty acid is obtained from an oil selected from the group consisting of safflower oil, sunflower oil, tung oil, canola oil, tall oil, dehydrated castor oil, soya bean oil, oiticica oil, plukenetia oil, perilla oil, hemp-seed oil, walnut oil, tobacco seed oil and linseed oil. The monobasic acid is preferably selected from the group consisting of acrylic acid, methacrylic acid, crotonic acid and vinylacetic acid. The reactive monomer is preferably selected from the group consisting of styrene, vinyl toluene and the acrylic and methacrylic acid esters of $C_1$–$C_{10}$ alcohols.

Typically, 65–75 parts of the esterified epoxy resin is reacted with 35–25 parts of the mixture of unsaturated monobasic acids and reactive monomers. The reaction between the resin and such mixture is carried over a 2 hour period at 120°–150° C. in the presence of about 1–6 wt % of a peroxide catalyst such as di-tert. butyl peroxide, benzoyl peroxide, cumene peroxide, tertiary butyl perbenzoate, tertiary butyl hydroperoxide, and the like. The resultant solution is then neutralized with an amine to a pH of about 5–9 to make it water dilutable.

Resins of the type employed in the water-based printing inks of the present invention are well known and are usually utilized in the form of a solution wherein organic solvents are generally present in an amount such that the solvent content will be in the range of about 3–15 wt %, based on the weight of the finished ink.

Useful organic solvents for dissolving the resin include glycol ethers and alcohols such as ethylene glycol monomethyl ether, ethylene glycol mono-n-propyl ether, ethylene glycol mono-n-butyl ether, ethylene glycol mono-n-hexyl ether, ethylene glycol monophenyl ether, propylene glycol monomethyl ether, propylene glycol mono-n-propyl ether, propylene glycol mono-n-butyl ether, propylene glycol monophenyl ether, diethylene glycol monomethyl ether, diethylene glycol monoethyl ether, diethylene glycol mono-n-butyl ether, diethylene glycol mono-n-hexyl ether, dipropylene glycol monomethyl ether, dipropylene glycol mono-n-propyl ether, dipropylene glycol mono-n-butyl ether, tripropylene glycol monomethyl ether, ethyl alcohol, n-propyl alcohol, isopropyl alcohol, n-butyl alcohol, sec-butyl alcohol, and mixtures thereof.

Epoxy ester resins useful for the present invention may be prepared in accordance with the teachings of U.S. Pat. No. 4,166,054 to Charles J. Meeske et al. and assigned to Reichhold Chemicals, Inc., and incorporated herein by reference. These resins are commercially available; a useful example of such resin is Reichhold Chemicals' Epotuf® Epoxy Ester Resin 92-737 dissolved in a mixture of 15% ethylene glycol monobutyl ether, 6% ethylene glycol monobutyl ether and 9% sec-butyl alcohol. This solution contains 70±2% non-volatiles, an acid number of 54–60 and a Gardner-Holdt viscosity of $Z_7$–$Z_8$.

The pigment is typically present in an amount of about 5–30 wt %, preferably 10–20 wt. %, based on the weight of

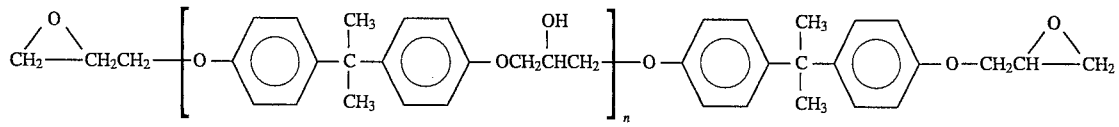

The epoxy ester resin is typically utilized in a neutral form. Such neutral form may be readily obtained by neutralization of about 94 parts of the resin with 6 parts of an the ink. Suitable pigments include CI Pigment Yellow 12, CI Pigment Yellow 42, CI Pigment Black 7, CI Pigment Black 11, CI Pigment Red 9, CI Pigment Red 17, CI Pigment Red 22, CI Pigment Red 23, CI Pigment Red 57:1, CI Pigment Red 67, CI Pigment Red 146, CI Pigment Red 224, CI Pigment Green 7, CI Pigment Green 36, CI Pigment Blue 15:3, CI Pigment Violet 23 and CI Pigment Violet 32.

The drier is present in an amount of about 0.1–5 wt. %, preferably 0.5–3 wt. %, based on the weight of the ink. Suitable driers comprise the octoates, resinates, naphthenates, neodecanoates, tallates and linoleates and mixtures thereof of metals selected from the group consisting of calcium, cobalt, magnesium, manganese, zinc, cerium, zirconium and mixtures thereof. Desirably, a drier activator such as 2,2'-bipyridyl is incorporated in the ink in an amount of about 0.1–1 wt. %.

The cyclodextrin is present in an amount of about 0.5–5 wt. %, preferably 1–3 wt. %, based on the weight of the ink. Suitable cyclodextrins comprise α-cyclodextrin, β-cyclodextrin, γ-cyclodextrin and derivatives of such cyclodextrins such as hydroxypropyl-γ-cyclodextrin, hydroxypropyl-β-cyclodextrin, hydroxyethyl-β-cyclodextrin, methyl-β-cyclodextrin, triacetyl-βcyclodextrin, maltoscyclodextrin, trimethyl-βcyclodextrin, sulfated-α-cyclodextrin, sulfated-β-cyclodextrin, sulfated-γ-cyclodextrin, carboxymethyl-β-cyclodextrin, and the like. For the purposes of the present invention, the preferred cyclodextrin comprises γ-cyclodextrin.

The printing ink of the invention desirably also contains a wax present in an amount of about 1–5 wt. %, based on the weight of the ink. Such wax may be a polytetrafluoroethylene wax, polyethylene wax, Fischer-Tropsch wax, silicone fluid and mixtures thereof. It is also desirable to incorporate a defoamer in the ink in an amount of 0.1–0.5 wt. %, based on the weight of the ink.

The balance of the ink will consist of water. Typically, the water will be present in an amount of about 30–60 wt. %, based on the weight of the ink.

The water-based inks of the invention will typically have a viscosity of about 25±2 sec. as measured on a #2 Zahn cup at 20° C. and may be printed at speeds of up to 200 m/min. The inks dry rapidly—typically the imprinted substrate will be cured in ovens of 5–6 meters in length at temperatures of 80° to 180° C. and a residence time of 0.1 to 2 seconds. Thus a second color may be printed almost instantaneously upon a previously-printed color.

The following examples shall serve to illustrate the invention. Unless otherwise indicated, all parts and percentages are by weight.

EXAMPLE 1

For comparative purposes, a conventional water-based printing ink was prepared from the components indicated in Table I below; this ink contained no driers.

TABLE I

| "Epotuf" 92–737, 70% solids | 28.6 |
| --- | --- |
| Triethylamine | 0.9 |
| Dimethylaminoethanol | 0.9 |
| CI Pigment Red 17 | 15.0 |
| Polyethylene Wax | 3.3 |
| Silicone Emulsion | 1.3 |
| Defoamer | 0.2 |
| Water | 49.8 |
|  | 100.0 |
| Printability | good |
| Odor | standard |
| pH 12 Solution Resistance | good |
| 1% Aqueous Ammonia Resistance | none |
| Gloss | high |
| Stability | good |

Incorporation of a drier in the ink would improve the formulation by crosslinking the epoxy ester resin and provide excellent resistance properties. However, metallic driers often hydrolyze in water; thus their use would be altogether precluded or such usage would lead to instability problems or objectionable odors. Examples 2 and 3 set forth below illustrate the problems caused by the use of metallic driers in varying amounts.

EXAMPLE 2

A water-based printing ink was prepared from the components indicated in Table II below; this ink contained the drier cobalt naphthenate and the drier activator 2,2'-bipyridyl.

TABLE II

| "Epotuf" 92–737, 70% solids | 28.6 |
| --- | --- |
| Triethylamine | 0.9 |
| Dimethylaminoethanol | 0.9 |
| CI Pigment Red 17 | 15.0 |
| Polyethylene Wax | 3.3 |
| Silicone Emulsion | 1.3 |
| Defoamer | 0.2 |
| Cobalt Naphthenate, 5% | 0.8 |
| 2,2'-Bipyridyl, 30% | 0.3 |
| Water | 48.7 |
|  | 100.0 |
| Printability | good |
| Odor | heavy |
| pH 12 Solution Resistance | very good |
| 1% Aqueous Ammonia Resistance | very good |
| Gloss | high |
| Stability | unstable |

A water-based printing ink was prepared from the components indicated in Table III below; this ink contained the drier cobalt naphthenate and the drier activator 2,2'-bipyridyl.

TABLE III

| "Epotuf" 92–737, 70% solids | 28.6 |
| --- | --- |
| Triethylamine | 0.9 |
| Dimethylaminoethanol | 0.9 |
| CI Pigment Red 17 | 15.0 |
| Polyethylene Wax | 3.3 |
| Silicone Emulsion | 1.3 |
| Defoamer | 0.2 |
| Cobalt Naphthenate, 5% | 0.4 |
| 2,2'-Bipyridyl, 30% | 0.3 |
| Water | 49.1 |
|  | 100.0 |
| Printability | good |
| Odor | moderate |
| pH 12 Solution Resistance | very good |
| 1% Aqueous Ammonia Resistance | weak |
| Gloss | high |
| Stability | unstable |

EXAMPLE 4

A water-based printing ink was prepared from the components indicated in Table IV below; this ink contained the drier cobalt naphthenate, the drier activator 2,2'-bipyridyl and γ-cyclodextrin. Based on these results, it appears that cyclodextrins have the capability of forming inclusion complexes with metallic driers thus "protecting" them from hydrolysis. The resulting water-based printing ink exhibited superior properties in respect to stability, odor and printability.

TABLE IV

| "Epotuf" 92–737, 70% solids | 28.6 |
|---|---|
| Triethylamine | 0.9 |
| Dimethylaminoethanol | 0.9 |
| CI Pigment Red 17 | 15.0 |
| Polyethylene Wax | 3.3 |
| Silicone Emulsion | 1.3 |
| Defoamer | 0.2 |
| Cobalt Naphthenate, 5% | 0.4 |
| 2,2'-Bipyridyl, 30% | 0.3 |
| γ-Cyclodextrin, 18% | 1.5 |
| Water | 47.6 |
| | 100.0 |
| Printability | good |
| Odor | slight |
| pH 12 Solution Resistance | very good |
| 1% Aqueous Ammonia Resistance | excellent |
| Gloss | high |
| Stability | good |

The inks were tested by imprinting on a polyethylene polycoated board. The drying cycle was 15 seconds in an oven at 80° C.

The prints were tested after exposure to ambient temperature for 24 hours. Resistance to the high pH reagents was evaluated as follows. The prints were placed on a flat surface. The appropriate solution was applied to the surface of the printed stock. After the appropriate time had elapsed, the solutions were wiped 5 times in one direction with tissue paper using moderate pressure in order to absorb bleed and loose pigment affected by the treatment solution.

What is claimed is:

1. A water-based oxidizing printing ink comprising:
   (a) an epoxy ester resin;
   (b) an inorganic and/or organic pigment;
   (c) a drier;
   (d) a cyclodextrin; and
   (e) water.

2. The ink of claim 1 wherein the epoxy ester resin is present in an amount of about 15–40 wt. %, based on the weight of the ink, and comprises the reaction product of (i) about 65–75 parts per hundred of the ester obtained from the esterification of about 40–60 parts per hundred of an epoxy resin with about 60–40 parts per hundred of a drying oil partially conjugated unsaturated fatty acid having an iodine number of about 125–185, an acid number of about 180–210 and a degree of conjugation of about 20–25%, said ester having an acid number below about 10, and (ii) about 35–25 parts per hundred of a mixture of about 20–28% of one or more unsaturated monobasic acids having a polymerizable double bond and about 80–72% of one or more reactive monomers having a polymerizable double bond, said epoxy resin comprising the condensation product of bisphenol A and epichlorohydrin and having an epoxide equivalent weight of about 400 to 1100 and represented by the structure below wherein n has a value of 0 to about 8:

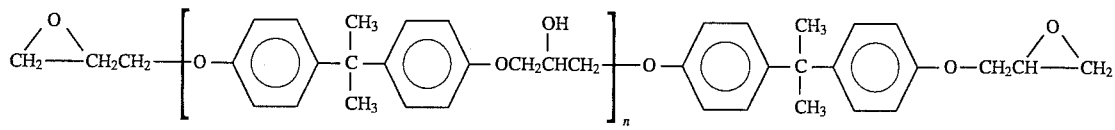

3. The ink of claim 2 wherein n has an average value of about 2.2.

4. The ink of claim 2 wherein the drying oil partially conjugated unsaturated fatty acid is obtained from an oil selected from the group consisting of safflower oil, sunflower oil, tung oil, canola oil, tall oil, dehydrated castor oil, soya bean oil, oiticica oil, plukenetia oil, perilla oil, hempseed oil, walnut oil, tobacco seed oil and linseed oil.

5. The ink of claim 2 wherein the monobasic acid is selected from the group consisting of acrylic acid, methacrylic acid, crotonic acid and vinylacetic acid.

6. The ink of claim 1 wherein the reactive monomer is selected from the group consisting of styrene, vinyl toluene and the acrylic and methacrylic acid esters of $C_{1-10}$ alcohols.

7. The ink of claim 1 wherein the pigment is present in an amount of about 5–30 wt %, based on the weight of the ink, and is selected from the group consisting of CI Pigment Yellow 12, CI Pigment Yellow 42, CI Pigment Black 7, CI Pigment Black 11, CI Pigment Red 9, CI Pigment Red 17, CI Pigment Red 22, CI Pigment Red 23, CI Pigment Red 57:1, CI Pigment Red 67, CI Pigment Red 146, CI Pigment Red 224, CI Pigment Green 7, CI Pigment Green 36, CI Pigment Blue 15:3, CI Pigment Violet 23 and CI Pigment Violet 32.

8. The ink of claim 1 wherein the drier is present in an amount of about 0.1–5 wt. %, based on the weight of the ink, and is selected from the group consisting of the octoates, resinates, naphthenates, neodecanoates, tallates and linoleates and mixtures thereof of metals selected from the group consisting of cobalt, magnesium, manganese, zinc, cerium, zirconium and mixtures thereof.

9. The ink of claim 1 including a drier activator comprising 2,2'-bipyridyl.

10. The ink of claim 1 wherein the cyclodextrin is present in an amount of about 0.5–5 wt. %, based on the weight of the ink, and is selected from the group consisting of α-cyclodextrin, β-cyclodextrin, γ-cyclodextrin and derivatives of such cyclodextrins.

11. The ink of claim 10 wherein the cyclodextrin comprises γ-cyclodextrin.

12. The ink of claim 1 including a wax present in an amount of about 1–5 wt. %, based on the weight of the ink, said wax being selected from the group consisting of polytetrafluoroethylene waxes, polyethylene waxes, Fischer-Tropsch waxes, silicone fluids and mixtures thereof.

13. The ink of claim 1 wherein the water is present in an amount of about 30–60 wt. %, based on the weight of the ink.

* * * * *